A. HERZ.

FUSE DEVICE.

APPLICATION FILED AUG. 13, 1917.

Reissued Apr. 20, 1920.

14,844.

3 SHEETS—SHEET 1.

Inventor
Alfred Herz
By Brown, Hanson & Bottcher
Attorneys

A. HERZ.

FUSE DEVICE.

APPLICATION FILED AUG. 13, 1917.

Reissued Apr. 20, 1920.

14,844.

3 SHEETS—SHEET 2.

Inventor
Alfred Herz
By Brown, Hanson & Butcher
Attorneys

A. HERZ.
FUSE DEVICE.
APPLICATION FILED AUG. 13, 1917.
Reissued Apr. 20, 1920.
14,844.
3 SHEETS—SHEET 3.
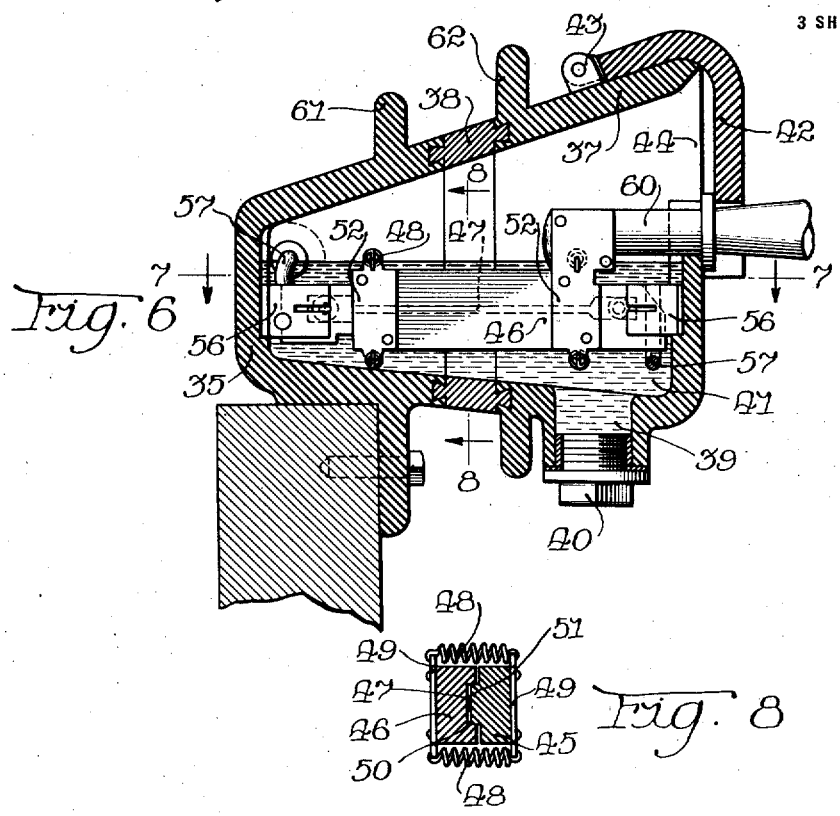
Fig. 6
Fig. 8
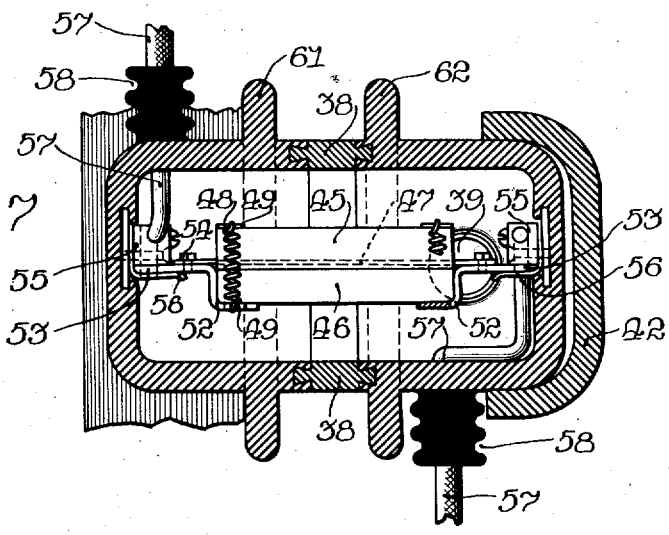
Fig. 7
Inventor
Alfred Herz
By Brown, Hanson & Bartlett
Attorneys

UNITED STATES PATENT OFFICE.

ALFRED HERZ, OF CHICAGO, ILLINOIS, ASSIGNOR OF ONE-HALF TO EDMUND O. SCHWEITZER, OF CHICAGO, ILLINOIS.

FUSE DEVICE.

14,844. Specification of Reissued Letters Patent. Reissued Apr. 20, 1920.

Original No. 1,222,952, dated April 17, 1917, Serial No. 604,836, filed January 26, 1911. Application for reissue filed August 13, 1917. Serial No. 186,039.

*To all whom it may concern:*

Be it known that I, ALFRED HERZ, a citizen of the United States, residing at Chicago, in the county of Cook and State of Illinois, have invented a certain new and useful Improvement in Fuse Devices, of which the following is a full, clear, concise, and exact description, reference being had to the accompanying drawings, forming a part of this specification.

My invention relates to fuse devices, that is devices or apparatus embodying or relating to fuses or like devices for operation on excess or overloaded current.

The object of the present invention is to provide certain advantageous features in connection with devices of this kind, as for example the prevention of arcing by the fuses upon operation, the adequate and proper protection of the devices against damage or injury upon the operation of the fuse, adaptation of the mechanism for withstanding currents from high capacity generators, the arrangement for easily constructing, mounting, repairing and reëquipping of the device and the accomplishment of the foregoing and other desirable results in a simple and expeditious manner.

In two applications heretofore filed by Edmund O. Schweitzer and myself to wit Serial No. 366,219, filed April 3d, 1907, and Serial No. 514,719 filed August 26th, 1909, both for fuse devices, there are shown structures of this general type which embody to some extent and claim certain of the features of construction and operation set forth in the present application.

In the accompanying drawings—

Fig. 6 is a vertical section of a modified form of device;

Fig. 7 is a horizontal section taken on line 7—7 in Fig. 6;

Fig. 8 is a cross section of a portion of the device taken on line 8—8 in Fig. 6.

Figure 1:
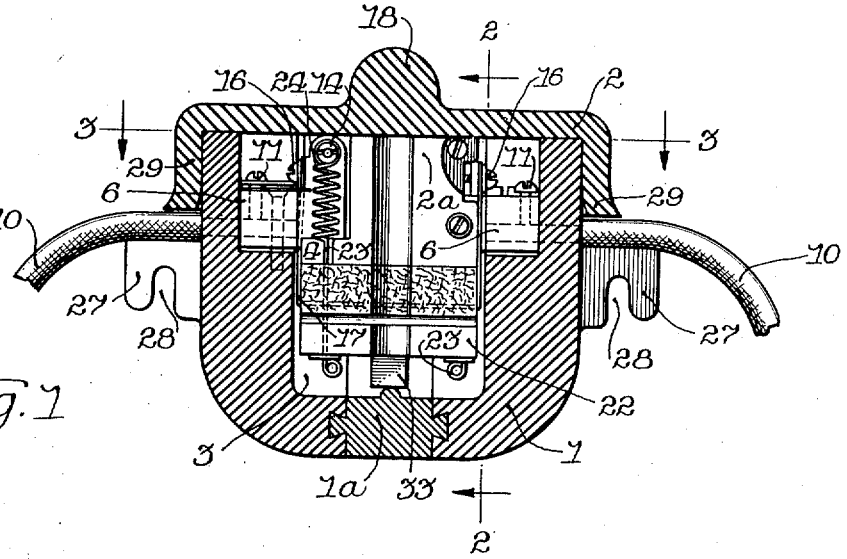
Figure 1 is a vertical section of a fuse device embodying my present invention.
Figure 2:
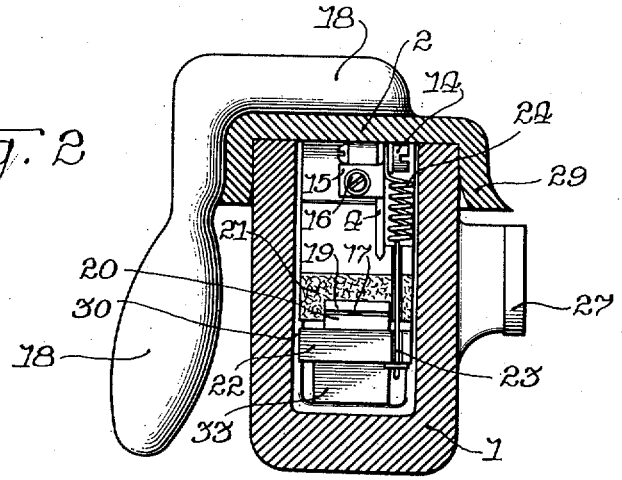
Fig. 2 is a section taken on line 2—2 in Fig. 1.
Figure 3:
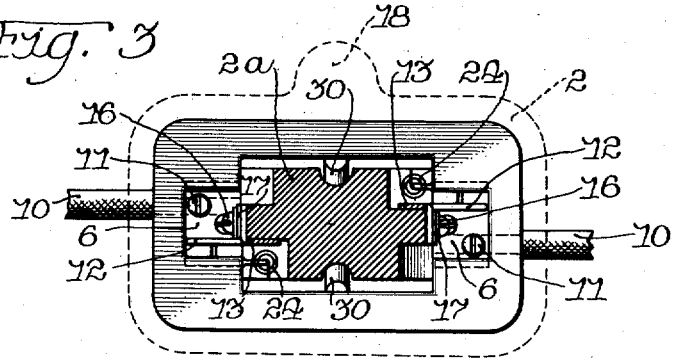
Fig. 3 is a horizontal section taken on line 3—3 in Fig. 1.
Figure 4:
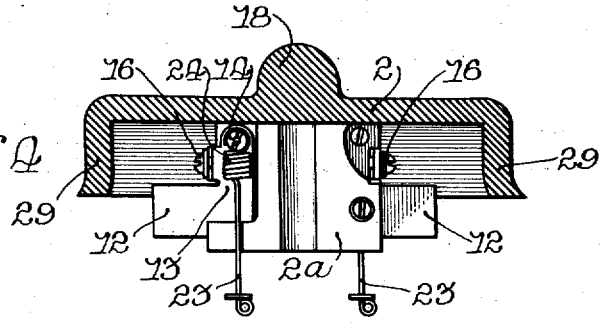
Fig. 4 is a view partially in section of a cover of a device of the preceding figures, removed from the base portion thereof.
Figure 5:
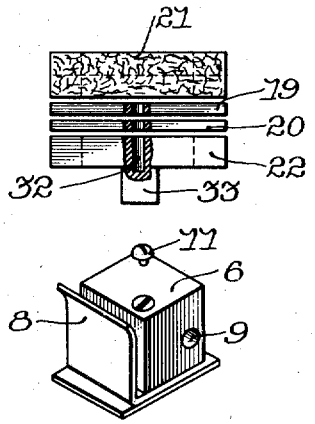
Fig. 5 is a view of a detail of construction.

Referring first to the device shown in Figs. 1 to 5 inclusive, I show a base or socket member 1, and a top or plug member 2, adapted to coöperate with the base 1 to form the complete device. The base member 1 is provided with a socket 3 adapted to receive the plug or projecting portion 4 on the top member 2. The socket 3 is widened at its top, as shown in Fig. 1, and terminal clips 6—6, Figs. 1, 3 and 5, are secured as by screws 7—7 into the enlarged portions at the upper end or mouth of the socket 3. These terminal clips are preferably box-like, metallic structures having side lips, 8—8, forming with the main body portions spring jaws for the reception of metallic contacts. These terminals 6—6 are also provided with apertures 9—9 to receive the pigtail conductors 10—10, to be connected with the device and are further provided with screws 11—11, by which said conductors are held in place.

The plug member 2 is provided with knife blade clips 12—12, Fig. 4, which are adapted to fit into the sockets or recesses of the terminals 6—6, these knife blade clips having upward extensions 13—13 which are secured to the plug portion of said member by screws 14—14. These clips 12—12 are also provided with bent back ears 15, Fig. 2, provided with terminal screws 16, for the attachment of the fuse 17, Fig. 1. The top member, it will be seen can be inserted in position in the bottom or socket member, and removed therefrom, and when this is done the knife blades 12, 12 will be inserted in and withdrawn from the terminals 6—6, according to the position of the top or plug member 2. For this purpose a handle 18 is preferably provided the handle shown being secured to the top or plug member 2, and extended thence to one side and then downwardly so as to permit its being grasped readily from below. This is advantageous, of course, when the device is put on top of a pole.

The fuse 17 is shown extended down from the clips, and passed across the lower portion of the plug member between the blocks or slabs 19 and 20 of some suitable material of high refractory qualities. I have found limestone and silica both to have these qualities and to be especially advantageous for use in connection with fuses as they withstand arcing of the fuse or the tendency of the fuse to arc with practically no injurious effect whatever. I consider limestone and silica to be equivalents. This is of special importance where the fuse is used in circuits of high capacity generators, so that the fuse has to withstand not only the high potential of the circuit, but also the tremendous capacity of the energy of a large modern type generator. These materials which I have mentioned, limestone and silica, have this highly desirable effect, and have been found to have these qualities only after much diligence, investigation and experimentation on my part. The two blocks or slabs, 19 and 20, shown in the drawings are arranged in position at the lower portion of the plug member 2 of the device. The upper one 19 is carried by and preferably securely fastened to an intermediate layer or block 21 of material, preferably asbestos. A combination of limestone or silica and asbestos in this general way is very advantageous because of the high heat resisting, insulating and non-combustible character of asbestos. It is not essential to have this asbestos used in this way, as the device could be constructed and operated without it. I prefer, however, to employ it and secure it fixedly to the bottom of the plug $2^a$, which latter is preferably made of insulating material, such for example as porcelain. The other slab or block 20 of limestone or silica is preferably carried by and permanently secured to a bottom member 22, which may also be of insulating material, such as porcelain. This member 22 is hung or suspended by wires 23, forming part of springs 24—24 secured by the screws 14 to the upper end of the plug portion of the top member 2. A plurality of these springs are used, two being shown at diagonally opposite corners of the plug $2^a$ of the top member. The fuse can be put in place by fastening its ends to the clips 13—13 by means of the screws 16—16, and may be extended down and across the plug $2^a$ and between the members 19 and 20.

The bottom member 1 is preferably provided with laterally extending supporting ears 27 having grooves or slots 28 to receive screw bolts which may be applied to the post to support the device. This permits the bolts to be first put into position and screwed nearly to their ultimate position without having to support the weight of the fuse device, and then when they are so inserted the device can be placed upon them and the bolts screwed home. The top 2 is preferably provided with skirts or petticoats 29 for rain protection. The plug $2^a$ is desirably provided with vertically extending grooves 30—30 arranged on each side and the fuse holding members 21 and 22 are desirably provided with similar grooves, thus forming continuous grooves from top to bottom of the plug portion of the device. The socket member 1 is provided with projecting ridges $1^b$, adapted to fit into the grooves 30—30, and so guide the upper member 2 when it is inserted into and withdrawn from the lower ones. The fuse holding members 19 and 20 are desirably provided with small apertures or holes 32—32, as is also the member 22. This has the effect of controlling the rating or capacity of the fuse according to the size of this aperture or port. A plug 33, of wood or other desirable material, is preferably secured to the bottom of the member 22, thereby forming a stop or button to limit the insertion of the plug member of the device.

The base or socket member 1 is desirably made of different material joined or connected together in convenient sectional form or arrangement. In the device as shown this is brought about by inserting a piece $1^a$, of material different from the rest of the base member, as shown in Fig. 1. This sectional piece $1^a$, may be fitted in place in any desired manner, as for example by dove-tailing it as shown in said figure. This sectional or insert piece $1^a$, may be of suitable material as compared with the balance of the receptacle, a convenient and highly advantageous arrangement being to make the body or receptacle or base 1, of porcelain, and this insert $1^a$ of silica, limestone or other compound. In building a receptacle in this manner, I first form the insert member $1^a$ with suitable projecting tongues as shown. Then the porcelain pieces 1 are molded upon the piece $1^a$ and the whole is baked. It is obvious that the grooves may be placed in piece $1^a$ and the tongues in piece 1 if so desired. Also other methods of manufacture may be employed. This construction has the effect of increasing the resistance of the structure between the fuse terminals and thereby prevents leakage of the current between such terminals. The construction also has the advantage of allowing the size of the base to be varied by use of different size inserts. This sectional idea can be carried to further lengths, of course, if desired. The sectional insert $1^a$ is understood to be a continuous strip forming circumferential section of the base member 1.

Referring now to the construction shown in Figs. 6, 7 and 8 I illustrate a casing 35 of general rectangular cross section, as shown in Fig. 7, and having a sloping floor 36 and an inclined top 37. This casing 35 is desirably made of porcelain or other suitable material and is preferably constructed with a circumferential belt or strip 38 of different material, such as silicon or limestone, for the purpose and advantage as set forth in connection with the preceding construction. The floor 36 is provided with a discharge outlet or opening 39, normally closed by plug 40. The device is intended to contain oil 41 and this sloping floor and outlet arrangement are intended to serve as a drain to permit drawing off of the oil from time to time as may be required in practice. A swinging cover 42 pivoted to the top portion of the device at 43 is arranged to close the opening 44 of the casing 35.

Within the casing is mounted a fuse holding or carrying structure or member, comprising suitable instrumentalities for holding a fuse and conveniently making separable and bodily removable from the device to permit its being removed and the fuse replaced, or for other purposes. The fuse carrying member shown embodies two slabs or strips 45 and 46, Fig. 8, with the fuse 47 arranged between them. These members 45 and 46 are held in place, and forced toward one another so as to hold the fuse under compressed by springs 48—48, which engage cross strips or plates 49—49, arranged at the ends of the slabs 45 and 46. The member 45 is preferably made with a channel or groove 50 and the member 46 with a projecting portion 51, which is arranged for insertion in this channel 50, into which latter the fuse is placed. Clips 52—52 are secured to the member 46 and provided with end portions 53—53 forming knife blade contacts, to which the fuse 47 is connected by screws 54. The casing 35 is provided with terminal members 55, having spring jaws 56 adapted to receive the knife blade contacts 52—52 of the fuse member, and to thus hold the fuse carrying device removably in place in the casing. The conductors 57—57 are led from these terminals 55 out of suitable apertures in the sides of the casing 35, and out through insulators 58—58 secured to the casing 35. As a convenient means for removing and replacing the fuse holding member, a handle 60 is secured to one end of said member and extended out through the opening 44 of the casing 35, so as to permit said handle to be readily grasped from the outside.

The casing 35 is adapted to be filled with oil such for instance as transformer oil or other suitable insulating liquid to a sufficient depth to cover the fuse and compression block completely. The use of oil in connection with the fuse and compression block is an important part of my invention. The current interrupting capacity of the device is increased to a marked extent. Reliability is increased and danger of explosion is practically eliminated.

A fuse immersed directly in oil has been found to be generally less reliable than a fuse in air. The operation is variable.

The factors that cause this are as follows:

When a fuse is disposed directly in the oil the heat of the fuse is given up to the oil and the oil begins to circulate, cooling the fuse and effecting its rating. This is undesirable. When the bare fuse in oil is vaporized as by a short circuit current, the vaporization of the metal and the oil blows a hole in the body of oil within which the arc is maintained for a short time.

This vaporization and the ensuing arc carbonize the oil and consequently decrease its insulation value very greatly.

In the use of the fuse with compression blocks and without the oil bath I have found that while the device is generally very reliable within its rating, sometimes conducting vapors are expelled along the side of the block. As a consequence an arc will be reestablished outside of the compression blocks even after it is once extinguished between the blocks. The first interruption of the current causes a sharp rise in voltage which seeks to reëstablish the flow of current. I have also found that as the fuse is made of soft metal and is bare, it is often attacked by acid fumes or other impurities in the air. Similarly the other exposed metallic parts become corroded though in less degree.

According to my invention the metal contact parts and particularly the fuse are protected from corrosion, the body of oil or other insulating liquid. During blowing of the fuse the oil prevents metallic vapors from being expelled from between the blocks and this confines the current to the zone of action of the compression blocks and prevents the formation of an arc. Consequently the oil is not vaporized and carbonized and does not lose its insulation value. The compression blocks restrict the contact of the oil with the fuse.

The effect is that of confining the fuse on all sides. On two sides the fuse is confined by means of the solid compression blocks and upon the other two sides by the liquid which, while it acts as a barrier, is readily squeezed out by the spring-pressed blocks when the fuse softens.

The oil is also highly beneficial in preventing absorption of fumes and moisture by the porcelain casing.

The casing 35 is desirably provided with circumferential flanges 61 and 62 which form heat radiating surfaces to increase the heat radiating power of the device.

It will be understood that changes and modifications can be made without departing from the spirit of the invention.

What I claim is:—

1. A fuse device having a casing provided with interiorly arranged contact members, in combination with a fuse holding device provided with contact members to coöperate with said contact members in the casing, said casing having an aperture through which the fuse holding device may be inserted into and withdrawn from the casing, said fuse holding device having a member projecting out through said aperture when the fuse holding device is in position in the casing, and a closure for said aperture, said closure being adapted to engage said projecting member and thereby hold the same in position.

2. A fuse device having a casing provided with interiorly arranged contact members, in combination with a fuse holding device provided with contact members to coöperate with said contact members in the casing, said casing having an aperture through which the fuse holding device may be inserted into and withdrawn from the casing, said fuse holding device having a member projecting out through said aperture when the fuse holding device is in position in the casing, and a closure for said aperture, said closure being adapted to engage said projecting member and thereby hold the same in position, said projecting member being adapted to serve also as a handle for said fuse holding device.

3. A device of the class specified comprising a casing having an aperture, contact members within the casing, a fuse holding device adapted for insertion into and withdrawal from the casing through the aperture therein, said fuse holding device being provided with contact members coöperating with those in the casing, said fuse holding device having a projecting member extending outwardly through said aperture and from the casing, and a closure for said aperture, said closure being mounted to permit of its being moved into position substantially parallel with the wall having said aperture, and into engagement with said projecting member, whereby said closure may merely by being brought into closed position, hold said projecting member in position.

4. A device of the class described, comprising a receptacle having top, bottom and side walls, a fuse carrying structure detachably mounted within the receptacle, a support for said fuse carrying structure secured to one of said side walls, another support for said structure on the side wall opposite to said first mentioned support, and a cover hingedly secured to said receptacle and engaging the fuse carrying structure between said cover and the wall which forms a support for the fuse carrying structure.

5. A device of the class specified comprising in combination, a casing having an opening in one side near the top thereof, a fuse holding device arranged to fit in the lower portion of said casing below said opening, means for detachably mounting said fuse holding device in the lower portion of said casing, a closure for said opening, an aperture in said closure, and means projecting through said opening and through the aperture in said closure when closed, for removing and replacing said fuse holding device.

6. A fuse device comprising a casing having one of its vertical walls provided with a side opening sufficiently above the bottom to form a liquid chamber below said side opening, and a fuse supporting device adapted for insertion into and withdrawal from said casing through said side opening, said casing and fuse carrying device being provided with coöperating contact members to removably mount said fuse carrying device in such position that the fuse will be supported in position in said liquid chamber formed below said side opening.

7. A fuse device comprising a casing having a side opening located sufficiently above the bottom of the casing to form a liquid chamber below said side opening, contact members mounted on the side wall below said opening and also on the opposite side wall, a fuse supporting device provided with contact members adapted to coöperate with said side wall contact members, to hold said fuse supporting device in position with the fuse in said liquid chamber, a handle on said fuse supporting device projecting through said opening when the fuse supporting device is in position in the casing, and a downwardly extending closure for said opening, said closure when closed engaging said handle.

8. A device of the class described comprising a casing having opposite walls which are inclined in opposite directions with relation to each other, and having one of its side walls provided with an aperture through which a fusible member may be introduced, contact members mounted within the casing, apertures provided in the casing through which connections with said contact members are made, circumferential ribs provided upon said casing, and a closure for said first mentioned aperture being hinged to the upper wall of the casing beyond one edge of the casing and having a flange depending from the said edge over the first mentioned aperture.

9. A fuse device comprising in combination, a casing one of whose sides is higher than the other and is provided with an opening sufficiently above the casing bottom to form a liquid chamber below said opening, a fuse holding device for insertion into the casing through said side opening and contact members on the casing and fuse holding device to permit the latter to be removably mounted in position in the liquid chamber, and the space in the high side of the casing being sufficient to permit the fuse holding device to be lifted from its mounting and then moved sidewise out through the side opening.

In witness whereof, I hereunto subscribe my name this 7th day of August, A. D. 1917.

ALFRED HERZ.